Nov. 12, 1968    B. SMITH    3,410,490
AGRICULTURAL CHEMICAL SPRAYING
Filed Aug. 1, 1967    2 Sheets-Sheet 2

BASIL SMITH
*INVENTOR.*

BY

United States Patent Office 3,410,490
Patented Nov. 12, 1968

3,410,490
AGRICULTURAL CHEMICAL SPRAYING
Basil Smith, Lubbock, Tex., assignor to
W. R. Wood, Lubbock, Tex.
Substituted for abandoned application Ser. No. 323,371, Nov. 13, 1963. This application Aug. 1, 1967, Ser. No. 661,161
1 Claim. (Cl. 239—212)

This invention relates to spraying agricultural chemicals, and the equipment for this purpose.

In present day agriculture, it is often necessary to apply chemicals in farming operations. In this specification, when I say chemicals I mean agricultural chemicals such as insecticides, fungicides, or herbicides. In common practice these are applied generally in either of two ways. By aerial application, the chemicals are sprayed from an airplane. An advantage of aerial application is that it is quick, being able to cover a large field within an hour or two. Another advantage is that there is no heavy vehicular traffic over the land to compact the soil. In this regard, the aerial operation can be carried out if the field is muddy. The aerial operation has the disadvantage of requiring expensive equipment and of danger to the operator.

The second method in common practice today is by spraying attachments to the ordinary farm tractor; either by direct mounting on tractor or on a trailer. A tank carries a limited supply of solution of the chemical and is pumped to spray booms. Generally, the greatest span practical for the booms is twenty-five or thirty feet. Therefore, if one is to treat a field which is a half mile wide, one must traverse the field many times with the sprayer which is no more than thirty feet wide. The advantage of the ground spraying equipment is that the additional equipment is relatively inexpensive, so that each farm operator can afford to own his own. It is slow and it causes a certain amount of compaction of the soil by running the tractor over the land. It also cannot be carried on when the field is muddy.

According to this invention, the spray equipment is attached to the main water carrying pipe of an agricultural irrigation moving system. There are many types of agricultural irrigation pipe moving systems, one typical one is shown in U.S. patent to Ruddell No. 2,931,579. The advantages include that the spray equipment to add to the automatic irrigation pipe system, is a relatively small additional investment. The chemical can be applied quickly and safely. There is only slight compaction of the soil. The equipment can be operated in a muddy field.

An object of this invention is to apply agricultural chemicals to a field.

Another object is to achieve this rapidly with equipment requiring a low additional investment.

Another object is to apply agricultural chemicals to muddy fields.

Another object is to apply agricultural chemicals without danger to the operator or excessive compaction of the soil.

Still further objects are to achieve the above with a method that is rapid, inexpensive, and easy for inexperienced, unskilled people to perform.

Still further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which.

Figure 1:
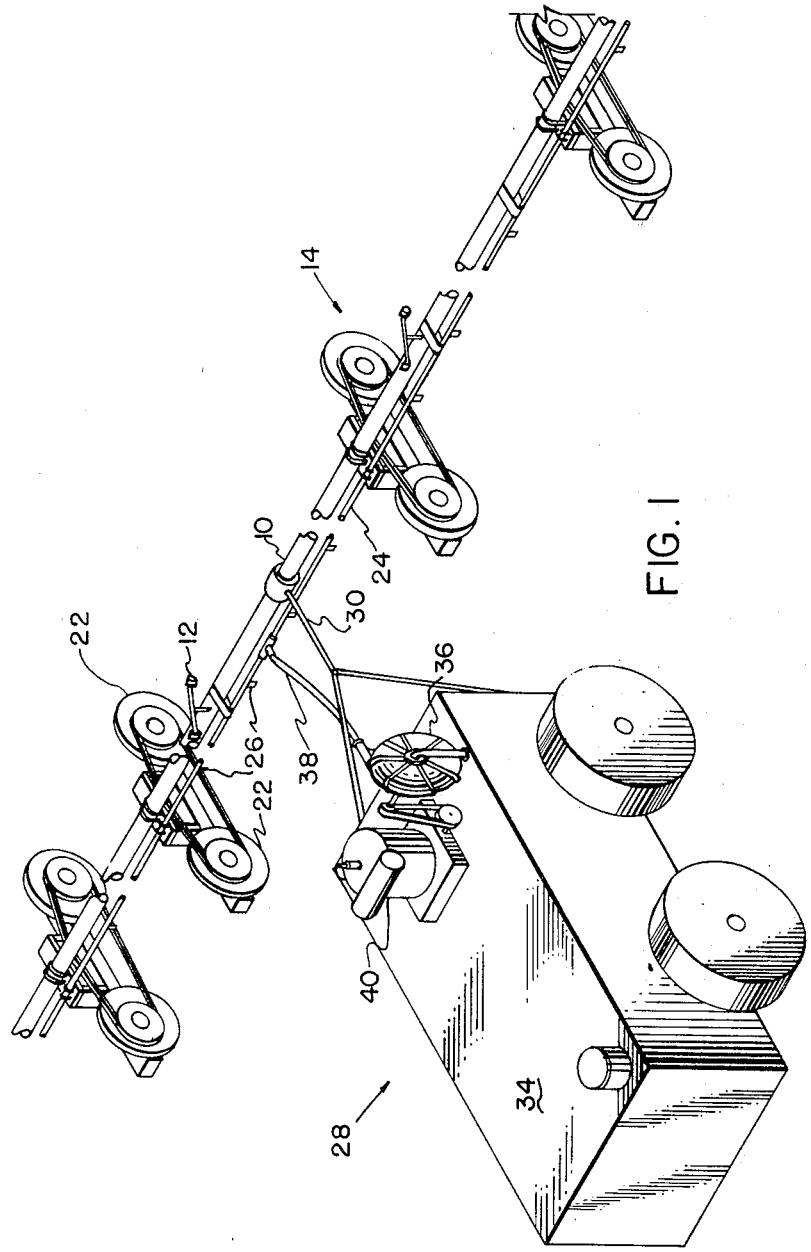
FIG. 1 is a perspective representation of one embodiment of this invention.
Figure 2:
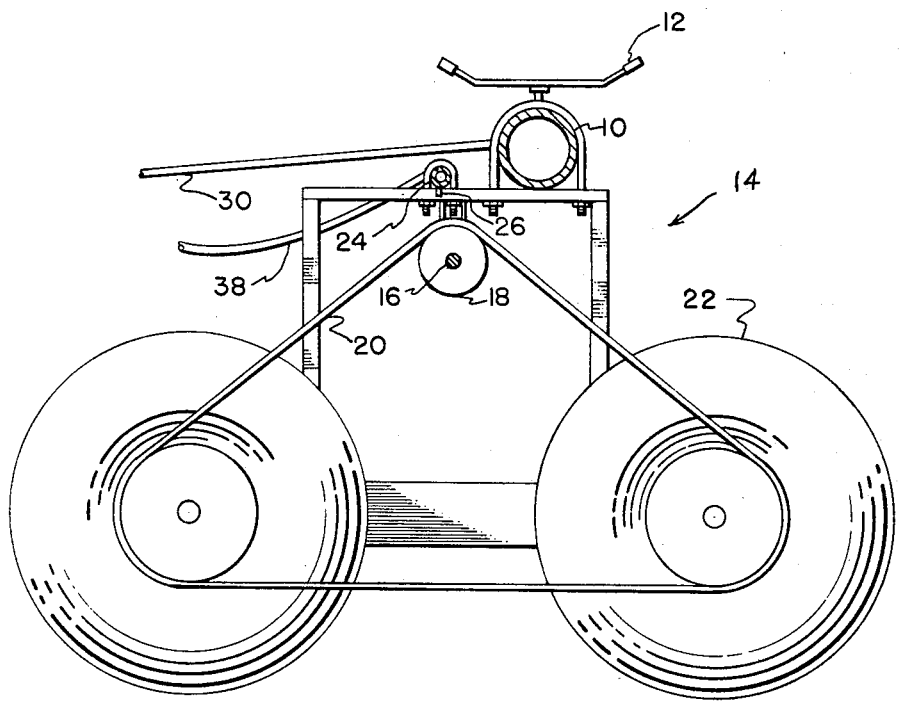
FIG. 2 is a sectional view taken substantially on line 2—2 of FIG. 1.

As may be seen in the drawing, this equipment uses an elongated pipe 10 which is adapted to carry water under pressure. Inasmuch as a source of water under pressure and means for connecting that source to the elongated pipe is conventional in the art, as illustrated in many issued U.S. patents, it is neither shown nor described.

The elongated pipe 10 has a plurality of sprinklers 12 for discharging water from the pipe 10 and irrigating the field. Also, the pipe 10 has a plurality of vehicles 14 for moving the pipe transversely or normal to its axis, across the field. The vehicles 14 have means for propulsion. In this particular embodiment, it is shown as shaft 16 which is journalled to each vehicle 14 for rotation. Means for rotating the shaft 16 are conventional in the agricultural irrigation pipe moving system art and therefore, are not shown nor described. According to the embodiment shown, sprocket 18 is mounted on the shaft 16 and chain 20 is trained around the sprocket 18 and sprockets on ground engaging wheels 22 of the vehicle 14. It will be understood that there are many ways to propel the vehicles 14 across the field and this one system is illustrative only.

The structure which has been described above is conventional and well known to the agricultural irrigation pipe moving art.

Tube 24 is attached to the pipe 10. The tube 24 is of smaller diameter than the pipe 10. Less agricultural chemical will be transported through the tube 24 than irrigation water will be transmitted through the pipe 10. Inasmuch as the tube 24 is of smaller diameter than the pipe 10, it lacks the rigidity to be self-supporting between the vehicles 14. Therefore, it is attached to the pipe 10, the pipe 10 providing a support structure for the tube 24 between the vehicles 14. Thus it may be seen that the pipe 10 performs the dual function of carrying water to the sprinklers 12 while the system is used for irrigation purposes and as a support for the tube 24 when the system is used for applying chemicals. A plurality of sprayers 26 are attached to the tube 24 for spraying the fluid chemical from the tube 24. The sprayers 26 are of a different nature than the sprinklers 12. The sprinklers 12 are designed to force a large volume of water for a considerable distance, e.g. fifteen feet. The sprayers 26 are designed to spray a small volume of chemical in an atomized mist for a short distance, e.g. fifteen inches. Therefore, for each sprinkler 12 along the pipe 10, there will be a plurality of sprayers 26 along the tube 24.

Trailer 28 is attached to the pipe moving system. It is shown attached by tongue 30 to the elongated pipe 10. It will be understood that the trailer 28 could be towed directly behind one of the vehicles 14. The trailer 28 has a plurality of ground engaging wheels 32 which support the tank 34 mounted on the trailer 28. The tank 34 contains the liquid chemical to be applied to the field. The chemical is pumped from the tank by pump 36 which has its intake into the tank 34 and its output connected through conduit 38 to the tube 24. The pump 36 is drivingly connected to motor 40 which, by way of example, may be a small one cylinder gasoline engine mounted on the trailer 28.

In operation, the water is drained from the pipe 10 and the pipe 10 disengaged from its source of water under pressure. The pipe moving system is moved to one edge of the field to be treated with chemical. Then the tank 34 is filled with the chemical to be applied, the motor 40 is started, thus pumping the chemical solution into the tube 24, and thus through the sprayers 26 onto the field. Also, the mechanism for rotating the shaft 16 is started, thus causing the pipe moving system to transverse the field simultaneously with the spraying of the chemical. The trailer 28 is towed by the system as it traverses the field. Inasmuch as there is no water in the pipe 10, the system is relatively light and does not compact the soil of the field. Also being light, the system can cross the field within a few hours, thus applying the chemicals far quicker than could be accomplished with conventional tractor mounted equipment.

It will be apparent that the embodiment shown is only exemplary and that various modifications can be made in construction, materials, and arrangement within the scope of the invention as defined in the appended claim.

I claim as my invention:

1. A combination irrigation system and agricultural chemical applicator system comprising: an elongated pipe adapted to carry water under pressure and having a plurality of sprinklers thereon for sprinkling water onto a field, a plurality of vehicles attached to and supporting the pipe for moving the pipe over the ground in a transverse direction with respect to the longitudinal axis of said pipe, means for propelling said vehicles including an elongated shaft extending between vehicles whereby all vehicles may be driven from a common power source, an elongated tube of smaller diameter than said pipe attached to said pipe and supported thereby, said tube extending the full length of said pipe, a plurality of spray nozzles on said tube, means attached to said pipe and vehicles for supplying agricultural chemicals to said tube to be dispensed from said spray nozzles on said tube, said last mentioned means including a trailer adapted to be towed along behind said pipe and vehicles, container means for agricultural chemicals on said trailer, a motor drivingly connected to a pump mounted on said trailer, said pump having an intake connected to said tank and an output conduit connected to said tube, the combination irrigation system and agricultural chemical applicator system being cooperatively associated whereby the two systems may be operated independently of each other and whereby agricultural chemicals may be quickly sprayed onto the field wherein the irrigation system is located.

References Cited

UNITED STATES PATENTS

| | | | |
|---|---|---|---|
| 1,439,461 | 12/1922 | Wood | 239—163 |
| 3,147,764 | 9/1964 | Jensen | 239—212 |

FOREIGN PATENTS

| | | |
|---|---|---|
| 374,330 | 4/1923 | Germany. |

EVERETT W. KIRBY, *Primary Examiner.*